United States Patent [19]

Sekmakas et al.

[11] 4,341,681
[45] Jul. 27, 1982

[54] MANNICH BASE COPOLYMERS

[75] Inventors: Kazys Sekmakas, Palatine; Raj Shah, Schaumburg; Aurelio J. Parenti, Norridge, all of Ill.

[73] Assignee: De Soto, Inc., Des Plaines, Ill.

[21] Appl. No.: 264,943

[22] Filed: May 18, 1981

[51] Int. Cl.³ .............................................. C08K 5/20
[52] U.S. Cl. .................................... 524/555; 526/307; 525/486; 525/481; 525/379; 525/157; 525/329; 524/901; 524/510; 524/512; 524/850
[58] Field of Search ............... 260/29.6 NR, 29.40 A; 526/307; 525/374, 157, 162, 163, 486, 481

[56] References Cited

U.S. PATENT DOCUMENTS

| | | | |
|---|---|---|---|
| 2,940,945 | 6/1960 | Christenson et al. | 260/21 |
| 3,163,623 | 12/1964 | Sekmakas et al. | 260/72 |
| 3,308,081 | 3/1967 | Glabisch | 260/29.6 |
| 3,994,989 | 11/1976 | Kempter et al. | 260/831 |
| 4,001,155 | 1/1977 | Kempter et al. | 260/29.2 EP |
| 4,014,955 | 3/1977 | Renner | 260/831 |
| 4,075,183 | 2/1978 | Kawakami et al. | 260/79.3 MU |
| 4,086,292 | 4/1978 | Kempter et al. | 260/831 |
| 4,134,932 | 1/1979 | Kempter et al. | 260/831 |
| 4,189,450 | 2/1980 | Kempter et al. | 525/455 |
| 4,229,267 | 10/1980 | Stemecker | 204/55 R |
| 4,251,410 | 2/1981 | Danner et al. | 260/29.40 A |
| 4,297,256 | 10/1981 | McDonald | 260/29.40 A |

Primary Examiner—Joseph L. Schofer
Assistant Examiner—Bernard Lipman
Attorney, Agent, or Firm—Dressler, Goldsmith, Shore, Sutker & Milnamow, Ltd.

[57] ABSTRACT

Cationic solution addition copolymers of monoethylenically unsaturated copolymerizable monomers are described having Mannich base side chains with the structure:

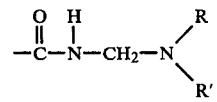

where R and R' are selected from $C_1$–$C_8$ alkyl and $C_1$–$C_8$ alkanol, or are together constituted by a $C_2$–$C_8$ alkylene group. This copolymer is preferably reacted with a diepoxide in a stoichiometric deficiency with respect to the amine groups in the side chains. At least a portion of the tertiary amine groups are then reacted with a solubilizing acid to form a salt which enables the copolymer to be dissolved in water.

11 Claims, No Drawings

MANNICH BASE COPOLYMERS

TECHNICAL FIELD

This invention relates to cationic resins containing Mannich base groups which dissolve in water with the aid of a solubilizing acid and which can be electrodeposited at the cathode and cured to provide coatings of improved corrosion resistance. Resins which are acrylic copolymers are particularly contemplated.

BACKGROUND ART

Cationic resins containing Mannich base groups are known. These are soluble in water with the aid of a solubilizing acid, even after post reaction with diepoxides. The known materials are described in U.S. Pat. Nos. 3,994,989 and 4,001,155. While these known materials have various deficiencies which are avoided by the prior contribution of two of us (K. Sekmakas and R. Shah in Ser. No. 160,606 Filed June 18, 1980) the corrosion resistance is still marginal, and improvement in this characteristic is the prime objective of this invention.

All of the efforts referred to in the preceding patent involve a bisphenol as the starting material. This is not done in this invention. Also, water solubility is obtainable in these prior efforts even when the water solutions are neutral or significantly alkaline. This is an advantage since it permits the formulation of electrocoating baths which are not significantly acidic, and hence not corrosive, and this advantage is retained herein. Moreover, in the prior contribution of Sekmakas and Shah referred to above, a superior distribution of Mannich base groups is obtained which leads to improved bath stability. This advantage is also retained in this invention where the distribution is again better than in the patents noted above.

DISCLOSURE OF INVENTION

Cationic solution addition copolymers of monoethyleneically unsaturated copolymerizable monomers having side chains of the following structure:

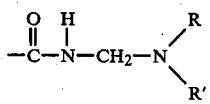

where $R$ and $R^{40}$ are selected from $C_1$–$C_8$ alkyl and $C_1$–$C_8$ alkanol, or are together constituted by a $C_2$–$C_8$ alkylene group, are reacted with a solubilizing acid to form a salt with at least some of the tertiary amine groups in the copolymer side chains to enable the copolymer to be dissolved in water.

In preferred practice, the tertiary amine copolymer described above is postreacted with a diepoxide which increases the molecular weight without preventing dissolution in water, and it serves to improve the corrosion resistance of coatings containing these copolymers.

These amine copolymers in dilute aqueous solution provide stable electrocoating baths which electrodeposit coatings at the cathode of a unidirectional electrical system. The usual concentration of resin solids in these baths is from 3% to 20%, more usually from 5% to 15%, by weight. The copolymers under consideration may be self-curing on baking, but it is preferred to include a curing agent which may be an aminoplast resin or a phenolic resin as part of the resin solids to enhance the cure.

The copolymers under consideration are made by copolymerization in organic solvent solution, the polymerization being conventional except that the side chains are converted to tertiary amine groups after polymerization. In making a water solution, the organic solvent used would normally be selected for water miscibility, and it would be retained and included in the water solution where it aids water dispersibility.

The side chains described previously are Mannich base groups, and they confer good water solubility even when so little solubilizing acid is used that the resulting water solution is neutral to alkaline. The final bath pH will normally range from pH 5–11, preferably pH 6–10.5, and most preferably pH 7–10. The capacity to avoid acidic baths minimizes corrosion problems in the electrocoating bath.

The capacity of Mannich base groups to solubilize aromatic resins is limited since the solutions tend to be unstable. The acrylic copolymers used herein more uniformly distribute the Mannich base groups over the resin structure, and this enhances solution stability which is essential to electrocoat application where the baths must be maintained over long periods of time.

Also, the prior art aromatic resins containing Mannich base groups provide only limited corrosion protection, and the copolymers of this invention produce superior corrosion protection which extends the utility of the Mannich base coating systems.

The monomers used to form the copolymers consist essentially of monoethylenically unsaturated monomers and these may vary considerably and fall into three categories.

First, we have nonreactive monomers which will constitute more than 50% of the copolymer. These identify monomers which react only through their single ethylenic group during polymerization and subsequent cure. Illustrative nonreactive monomers are styrene, vinyl toluene, acrylic and methacrylic esters with $C_1$–$C_8$ alkanols, such as ethyl acrylate and isobutyl acrylate or methacrylate, and vinyl acetate.

Second, we have the monoethylenic monomer which is to be used to provide the Mannich base groups after polymerization. Any monomer containing the N-methylol group can be used here, such as N-methylol acrylamide or methacrylamide or N-methylol allyl carbamate. The carbamate derivative is preferably used with styrene, vinyl toluene or vinyl acetate monomers, but when at least 25% of the copolymer is an acrylate ester, then the acrylamide or methacrylamide derivative is preferred.

It is desired to stress that an N-methylol functional monomer cannot be prereacted with secondary amine to provide the Mannich base group prior to polymerization because then the polymerization is less satisfactory and gelation becomes a problem.

In preferred practice, the N-methylol group is produced after polymerization is complete. This is conveniently done by including a carboxylic acid amide monomer (or a carbamate monomer) in with the monomers which are polymerized, and then post reacting the polymer with formaldehyde which is preferably supplied as paraformaldehyde. This reaction goes easily in the presence of an alkaline catalyst which may be the secondary amine reactant in whole or in part. The two-stage polymerization followed by formaldehyde reaction is well known, and the two stages can be combined into a single step as taught in Sekmakas, Ansel and Drunga U.S. Pat. No. 3,163,623 issued Dec. 29, 1964.

The N-methylol functional copolymer is then reacted with monosecondary amine in order to produce the desired side chains which are the Mannich base groups. All of the methylol groups can be converted or some of them can be left unreacted. All that is required is that enough of the Mannich base side chains be provided to produce solubility in water with the aid of a solubilizing acid.

Since the N-methylol functional monomer can be used as such or methylolated later, it is convenient to measure the proportion of this monomer by the proportion of its unmethylolated precurser, and this should be used in an amount of from 5% to 25% of the total weight of monomers which are copolymerized, preferably from 8% to 15%. It is not necessary to methylolate all of the precurser monomer since unreacted amide groups can be tolerated.

It is also desirable to include from 3 to 25%, preferably from 5% to 20% of the total weight of monomers, of an hydroxy functional monomer, especially 2-hydroxyethyl acrylate or methacrylate. The hydroxy functionality so introduced enhances the water solubility of the copolymer, and also the subsequent cure.

It is desired to point out that the Mannich base products previously produced using bisphenols and diepoxides included hydroxy functionality, but this was secondary hydroxy functionality. The hydroxy groups preferably used herein are primary hydroxy groups.

It is also permissible to have up to about 15% of the weight of the copolymer constituted by groups such as carboxyl groups or amide groups which do not change the essential interactions which are here described.

Any monosecondary amine may be used to react with the N-methylol groups of the copolymer. These amines are illustrated by di-N-butyl amine or di-N-ethyl amine. Diethanol amine will illustrate the hydroxy functional amines which are useful. The dialkyl amines and the hydroxy alkyl amines may be used in admixture.

The resulting copolymer with Mannich base side chains is then preferably reacted with diepoxide. The diepoxides may be based on aliphatic diols, such as 1,6-hexane diol, but aromatic diepoxides, especially diglycidyl ethers of a bisphenol having a molecular weight in the range of about 350 to about 5000 are used, preferably 350-600. The diepoxides can be used in admixture with monoepoxide so long as there is an average 1,2-epoxy equivalency of at least about 1.4. From 0.1-0.7, preferably from 0.3 to 0.6 equivalents of epoxide are used per equivalent of Mannich base in the copolymer. Bisphenols are a well known class of diphenols typically illustrated by bisphenol A.

The final Mannich base copolymer or its reaction product with diepoxide is then dispersed in water with the aid of a solubilizing acid. The solubilizing acids are well known and will be illustrated herein by dimethylol propionic acid. The acid proportion is governed by the desired pH of the final bath. This is typically about pH 8.5.

The products of this invention may contain methylol groups and hence self cure, but it is usually desirable to add a curing agent to the aqueous system which is applied to enhance the cure. Aminoplast resins and phenoplast resins are well known for this purpose and are useful herein in an amount of from 2% to about 35%, based on the weight of the Mannich base copolymer-epoxide reaction product. The selection of the curing agent which is optionally used is illustrated in the Example, but is not a feature of this invention.

Typical N-methylol functional copolymers which can be reacted with secondary amine for use in this invention are illustrated by a copolymer of styrene, acrylic ester (ethyl acrylate or isobutyl methacrylate) and acrylamide which is methylolated by reaction with formaldehyde during copolymerization. The preferred proportions are 10% to 20% of acrylamide, 30-50% styrene and 40-60% of the acrylic ester. Hydroxy ethyl acrylate is an optional preferred further monomer typically used in an amount of 10-14%. The N-methylol functional solution copolymers used herein are the same as those commonly used in solution thermosetting acrylic coatings and are well known and illustrated further in U.S. Pat. No. 3,163,623 noted previously, and these copolymers are further illustrated in the Example of this application.

EXAMPLE 450 grams of 2-butoxy ethanol are heated to 120° C. in a reactor. In a separate vessel, 170 grams of acrylamide are dissolved in 550 grams of butanol, and to this solution are added 430 grams of styrene, 530 grams of ethyl acrylate, 150 grams of hydroxyethyl methacrylate and 25 grams of polymerization catalyst (azobisisobutyronitrile) to form a monomer mixture. This monomer mixture is then slowly added to the reactor over a 3 hour period while maintaining a polymerization temperature of 120°-125° C. Thereafter, 5 grams of additional catalyst are added on two occasions, each followed by 1 hour at temperature to complete the conversion of monomers into an amide-functional copolymer. The copolymer solution is then cooled to room temperature for subsequent reaction.

72 grams of paraformaldehyde and 365 grams of diethanol amine are dissolved in 170 grams of 2-butoxy ethanol and the solution is added to the copolymer solution to provide a mixture which is heated to 50° C. and held for 2 hours. The product is then slowly heated to 120° C. and 36 ml. of water are stripped off. The product is cooled to 70° C.

To the solution product is added 280 parts of diepoxide (diglycidyl ether of bisphenol A having an average molecular weight of about 390—Epon 829 may be used) over a period of 15 minutes and held at 70° C. for 3 hours. The temperature is then maintained at 70° C. to 80° C. and vacuum is applied to remove any excess unreacted amine (an excess is used) and the product is then cooled to room temperature.

The product has a solids content of 63.3%. The copolymer initially formed contains 2.4 equivalents of amide functionality which is reacted with 2.4 equivalents of paraformaldehyde and with excess (3.5 equivalents of secondary amine). This provides about 2.4 equivalents of Mannich base which is post reacted with 1.4 equivalents of epoxide functionality in the diepoxide reactant. This allows the epoxide functionality to be substantially completely consumed without consuming all of the tertiary amine groups in the system, so some of these are left for salt formation with a solubilizing acid.

Upon salt formation by reaction with dimethylol propionic acid (25% of the amine functionality), addition of aminoplast curing agent (see note 1) [20% of total resin solids], and dilution with deionized water to 8% resin solids content, the electrocoating bath so-formed has a pH of 8.6, and a conductivity of 1290 micromhos. Note 1: partially methylated, partially ethylated water dispersible hexamethylol melamine—American Cyanamid product XM-1116 may be used.

In a typical electrocoating application onto phosphate-treated steel panels (EP-10), the coatings of this invention were compared with those of a superior cationic electrocoat system described in Sekmakas and Shah U.S. Pat. No. 4,172,062 issued Oct. 23, 1979, the patented system applying a coating of corresponding thickness from a bath containing 12% solids in which the copolymer was neutralized about 55% to provide a pH of 6.0 and a conductivity of 500–600 micromhos.

The coatings of this example are significantly superior in various ways. First, they provide a better combination of hardness and impact resistance. Thus, the impact resistance is slightly better (80 inch pounds v. less than 80 even though the coating are harder at 5 H pencil hardness v. 3-4 H). Most importantly it is found that the patented system failed detergent testing after only 72 hours while this example had not failed the same test after 400 hours.

What is claimed is:

1. A cationic solution addition copolymer of monoethylenically unsaturated copolymerizable monomers, said copolymer having side chains of the following structure:

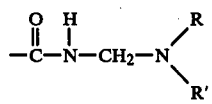

where R and R' are selected from $C_1-C_8$ alkyl and $C_1-C_8$ alkanol, or are together constituted by a $C_2-C_8$ alkylene group, at least a portion of the tertiary amine groups in said structure being reacted with a solubilizing acid to form a salt which enables the copolymer to be dissolved in water, said copolymer being reacted with a diepoxide in a stoichiometrec deficiency with respect said amine groups.

2. A cationic copolymer as recited in claim 1 in which said diepoxide is a diglycidyl ether of a bisphenol having a 1,2-epoxy equivalency of at least about 1.4 and is used in an amount of from 0.1 equivalents of epoxide per equivalent of tertiary amine in said copolymer.

3. A cationic copolymer as recited in claim 1 in which said copolymer comprises more than 50% by weight of nonreactive monomers and from 5% to 25% of the total weight of monomers of N-methylol functional monomer, measured by reference to its unmethylolated precurser.

4. A cationic copolymer as recited in claim 3 in which said N-methylol functional monomer is provided using acrylamide which is reacted with formaldehyde during or after the polymerization.

5. A cationic copolymer as recited in claim 3 in which said copolymer further includes 3% to 25% of the total weight of monomers of a hydroxy functional monomer.

6. A cationic copolymer as recited in claim 5 in which hydroxy functional monomer is 2-hydroxy ethyl acrylate present in an amount of 5% to 20% of the total weight of monomers.

7. A cationic copolymer as recited in claim 1 in which said copolymer includes N-methylol functionality.

8. A cationic copolymer as recited in claim 1 in which said copolymer is present in admixture with a curing agent selected from aminoplast and phenoplast resins used in an amount of from 2% to about 35% of the weight of the copolymer.

9. An aqueous bath comprising the cationic copolymer of claim 1 dissolved in water by salt formation with a solubilizing acid.

10. An electrocoating bath comprising the bath of claim 9 having a resin solids content of from 3% to 20% and a pH in the range of pH 5–11.

11. A method of forming a cationic copolymer comprising copolymerizing in organic solvent solution a mixture of monoethylenically unsaturated monomers including at least 50% of nonreactive monomers and from 5% to 25% of the total weight of monomers of an N-methylol functional monomer or a monomer which provides N-methylol functionality by reaction with formaldehyde during or after the polymerization, and then reacting the N-methylol functional copolymer produced by said polymerization with a monosecondary amine to convert at least some of said N-methylol groups to Mannich base groups, then reacting the Mannich base copolymer with a stoichiometric deficiency of diepoxide and then neutralizing at least a portion of the unreacted Mannich base groups with a solubilizing acid.

* * * * *